United States Patent

[11] 3,576,043

[72] Inventor Floyd E. Zongker
Tulsa, Okla.
[21] Appl. No. 884,232
[22] Filed Dec. 11, 1969
[45] Patented Apr. 27, 1971
[73] Assignee T. D. Williamson, Inc.
Tulsa, Okla.

[54] PIPELINE PIG WITH SPRING-MOUNTED SCRAPERS
8 Claims, 3 Drawing Figs.

[52] U.S. Cl. .................................................. 15/104.06,
166/172
[51] Int. Cl. ..................................................... B08b 9/04
[50] Field of Search ........................................... 15/104.05,
104.06, 104.09, 104.14, 104.19; 138/89; 166/170,
172

[56] References Cited
UNITED STATES PATENTS

| | | | |
|---|---|---|---|
| 957,051 | 5/1910 | Greenan et al. | 15/104.06(R) |
| 2,957,189 | 10/1960 | Nelson et al. | 15/104.06(R) |
| 3,047,895 | 8/1962 | Ver Nooy | 15/104.06(R) |
| 3,496,588 | 2/1970 | Ver Nooy | 15/104.06(R) |

OTHER REFERENCES
News from down the line. Tulsa, Okla., T.D. Williamson, Inc., May, 1968. (Copy in 15-104.06(R))

*Primary Examiner*—Ian A. Calvert
*Attorney*—Hyer, Eickenroht and Thompson

ABSTRACT: A pipeline pig is provided in which a number of scraper elements are supported by bowed leaf springs on the pig body with the leaf springs being connected to the body such that their ends are free to pivot with respect to the body when the central portion of the springs are moved radially of the body. The scraper elements are mounted on the springs by a slidable nonclamping connection whereby the springs are free to flex along their entire length between their ends. The scraper elements are connected to the body so that their movement along the springs is limited and have elongated upstanding ribs that are inclined with respect to the longitudinal axis of the pig body so that they exert a plowing action on the pipeline walls and tend to rotate the pig as it is moved along the pipeline. The scraper elements, due to the manner in which they and the springs are mounted on the body, present a maximum contact of the ribs with the pipeline so as to most positively effect such plowing and turning action.

PATENTED APR 27 1971
3,576,043
SHEET 1 OF 2
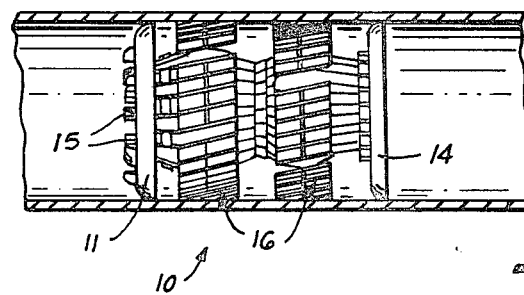
Fig_1
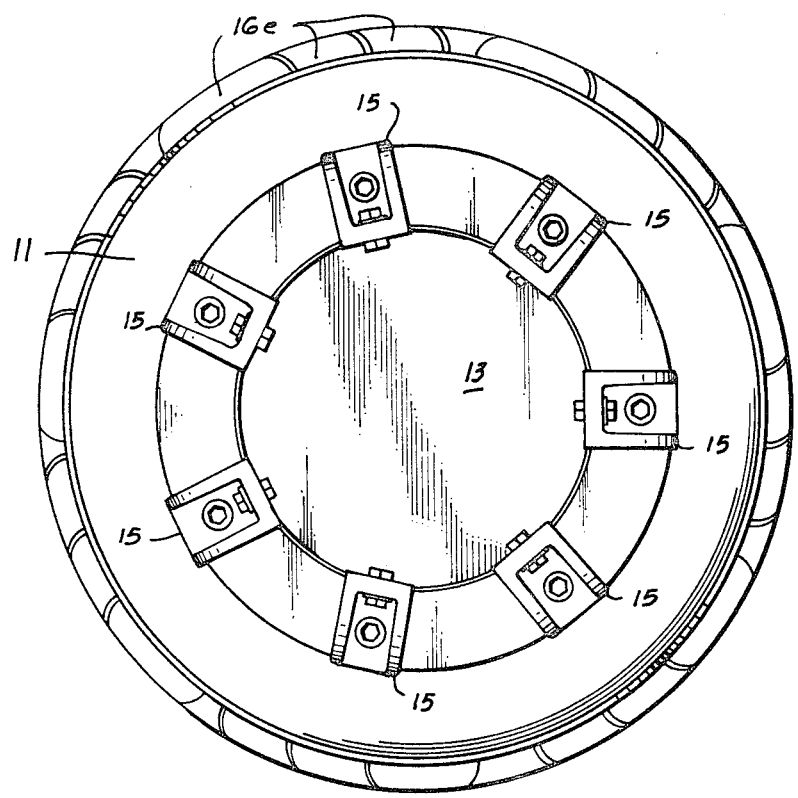
Fig_3
FLOYD E. ZONGKER
INVENTOR.
BY Hyer, Eickenroht
 & Thompson
 ATTORNEYS

PATENTED APR 27 1971

FLOYD E. ZONGKER
INVENTOR.

BY Hyer Eickenroht
 Thompson

ATTORNEYS

PIPELINE PIG WITH SPRING-MOUNTED SCRAPERS

This invention relates to a pipeline pig adapted to be propelled along a pipeline by fluid flowing through the pipeline in order to exert a scraping action on the interior of the pipeline to clean same. In one of its aspects, it relates to such a pig in which the scraper elements are mounted on the pig body by a bowed leaf spring arrangement and are so shaped as to exert a maximum plowing action on the pipeline walls and also tend to exert a turning action on the pig.

Pipeline cleaning pigs are known to the art as cleaning devices which are propelled through a pipeline by the fluid which normally flows through the pipeline, as distinguished from cleaning devices which are pulled through a conduit (such as a flue) by a cable or the like. Frequently the pigs will traverse many miles of pipeline before they are removed. During such passage, they may encounter out-of-round pipe sections, side openings (e.g., pipeline tees for branch lines), open valves, etc. Nevertheless, these pigs must be capable of exerting their cleaning or scraping action over these long distances and despite these and other obstacles. In order to do this, it is necessary that the cleaning elements, be they brushes or scrapers, be resiliently mounted on the pig body so that they are constantly urged outwardly into contact with the pipeline walls despite changes in circumferential configuration thereof, slight variations in inside diameter of the pipeline, etc. Various spring mountings have been proposed for the cleaning devices and several of these have found varying degrees of successful commercial useage. One of the simplest mounting devices has been the leaf spring. In some instances, the leaf spring has been U-shaped with one leg of the U-bolted to the pig body and the other, or free end, carrying the cleaning element to resiliently bias it outwardly. However, this U-shaped spring arrangement has the disadvantage of excessive breakage of the springs due to their having one end rigidly fixed to the pig body. Also, the active cleaning face of the cleaning element changes in its angular position with respect to the pipe walls as the element moved radially. Another spring arrangement has been to use the conventionally bowed leaf spring with the cleaning element tightly clamped to the spring at about the midpoint between its ends. While this reduces angular variations of the cleaning face of the cleaning element over those experienced with the U-shaped spring mounting arrangement, the clamping of the cleaning element to the spring effectively renders that part of the spring immobile insofar as spring action is concerned so that the cleaning element is in effect supported by two relatively short spring sections extending respectively to the front and rear of the element. This tends to make the leaf spring excessively stiff unless it is made very long and tends to concentrate stresses at the area where it is rigidly clamped to the cleaning element. Lengthening the spring to reduce these disadvantages is undesirable because it results in lengthening the pig considerably thereby making it difficult or impossible for the pig to traverse relatively short radius bends in the pipeline.

It is an object of this invention to provide a pipeline cleaning pig wherein a bowed leaf spring is employed to urge a scraping element outwardly against the inner walls of a pipeline with the arrangement being such that the leaf spring can flex along its entire length as a single effective spring so that the spring can be made relatively short and yet the scraping element is free to assume an attitude in which a maximum of its scraping face is always urged against the pipeline walls so as to evenly distribute wear over the entire face and to more effectively clean the pipeline walls.

Another object is to provide such a pig wherein the leaf spring arrangement is such that it effectively functions as a spring over substantially its entire length and yet the scraping element is effectively positioned and urged outwardly to exert a maximum effective scraping action on the walls of the pipeline.

Another object is to provide such a pig in which the scraping elements have elongated ribs inclined relative to the longitudinal axis of the pig so as to exert a plowing action on the pipeline walls and also tend to turn or rotate the pig as it moves along the pipeline to thereby more evenly distribute wear of the supporting peripheral sealing elements or cups more evenly about their circumference.

Other advantages, objects and features of the invention will be apparent to one skilled in the art upon consideration of the specification and drawings wherein:

FIG. 1 is a generalized side elevation of a pig embodying this invention and showing the pig in place in a pipeline;

FIG. 3 is a front end view of such a pig.

Figure 2:
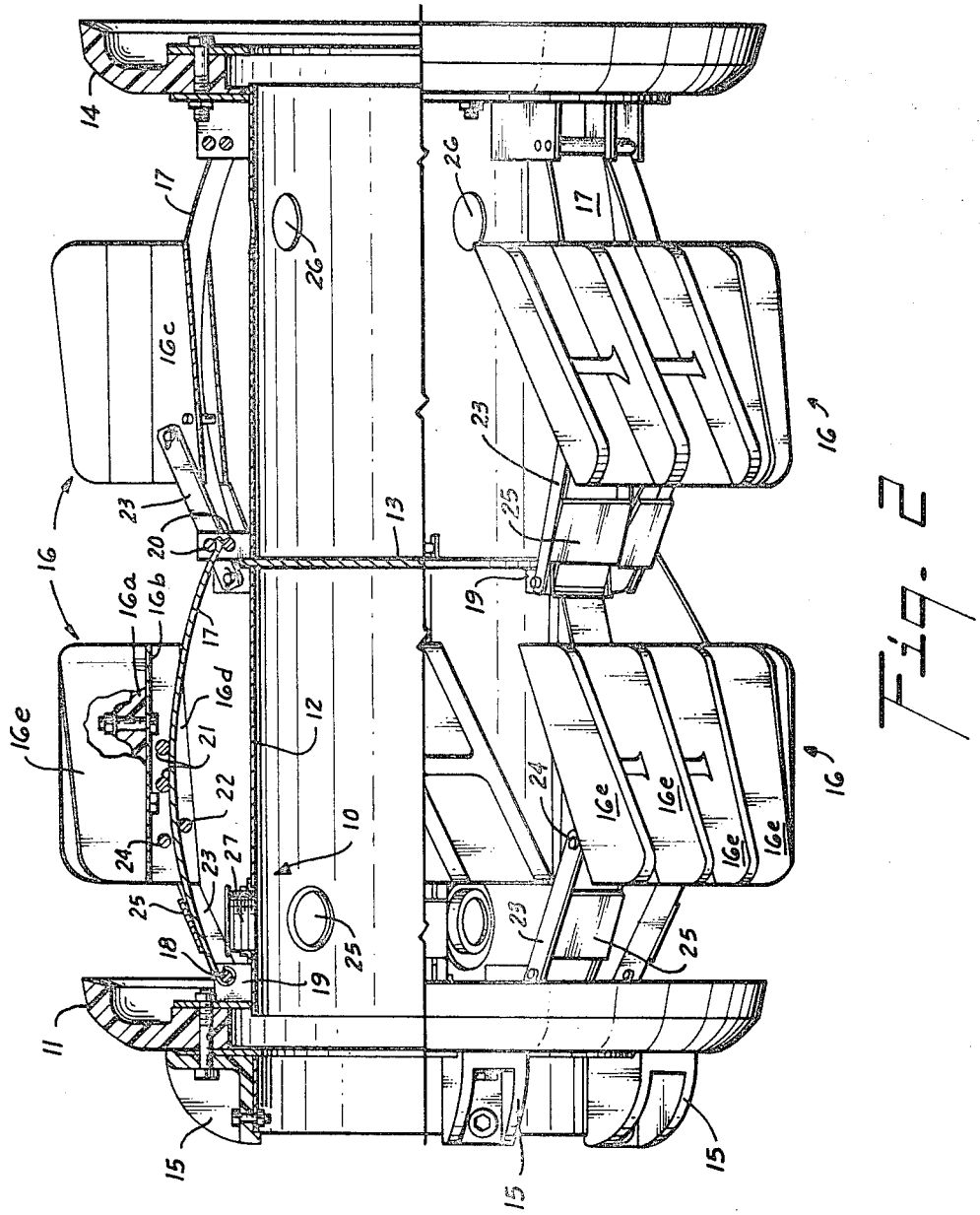
FIG. 2 is a side view of such a pig removed from the pipeline with the upper half of the pig being in cross section and the lower half in elevation.

Referring to FIGS. 2 and 3, the embodiment illustrates a pig having a body 10 which includes at least one circumferentially extending seal means adapted, when the body is inserted into a pipeline, to form a sliding seal with the inner walls of the pipeline. Here such sealing means is illustrated as a forward cup 11 bolted to the hollow cylinder 12 which is a part of body 10. A plate 13 extends across the cylinder 10 so that the cup 11, cylinder 12 and plate 13 together effectively form a piston movable along the pipeline by fluid flowing therethrough.

A second or rear cup can be provided and functions primarily to support the rear end of the pig in the pipeline.

The front end of the pig can be provided with a plurality of bumpers 15 (or a single annular one) bolted to the pig. These, among other things, aid in recentering the pig in the pipeline if it should become cocked as it passes a side opening.

A plurality of scrapers or scraping elements 16 are provided circumferentially about the pig body. The illustrated embodiment shows the scrapers arranged in two circumferential rows although where a lesser scraping action is required, a single row may suffice.

Each scraper includes a body portion 16a bolted to a support plate 16b having depending side flanges 16c and 16d. The body portion 16a has a plurality of elongate upstanding ribs 16e integral with it. The ribs extend generally longitudinally of the pig body but are inclined at an acute angle with the longitudinal axis of the pig body so that they provide a plowing action against the interior of the pipeline which aids in loosening and removing deposits on the inner walls of the pipeline. It will be observed that the inclination of these ribs provides a sideways wedging action against deposits encountered by them tending to move such deposits circumferentially of the pipeline thereby loosening the deposits so that they can be swept away by the pipeline fluid. While the more acute this angle of inclination is made, the greater will be the wedging force applied, nevertheless there must be a compromise between making the angle smaller and the number of ribs and the length of each required to obtain full-circle scraping action in the pipeline. The optimum angle will vary with the type of deposit to be loosened and the permissible length of the pig which is in large part determined by the sharpness of the bends in the pipeline which it must traverse.

While the rotational inertia of the entire pig is such that the reaction to the wedging force applied by the scraper ribs does not cause the pig to rotate any significant amount over a short distance along the pipeline, such reaction tends to rotate the pig body over long stretches of the pipeline and this has the advantage of distributing wear on cups 11 and 14 more evenly about their periphery.

A plurality of bowed leaf springs 17, one for each scraper, are provided to resiliently urge the scrapers outwardly of the pig body. Means are provided mounting the leaf springs on the pig body so as to permit at least one end of the leaf springs to move longitudinally of the body and to permit both ends of each leaf spring to pivot with respect to the body. Such means is illustrated as including a pin 18 about which the forward end of the spring is loosely curled with the pin being supported in brackets 19 attached to the pig body. The rear end of the spring extends loosely between a pair of pins 20 to slide therebetween when the spring is flexed.

The scrapers have a sliding, nonclamping engagement with their respective springs provided by pins 21 lying to the outside of the spring and extending between depending side flanges 16c and 16d. A keeper pin 22 can be provided between such flanges inside of the spring to prevent the scraper from moving away from the spring when the pig is out of the pipeline or passes a side opening.

The scrapers are limited in their movement along the springs by a suitable non-spring-clamping means. Such means is here illustrated as a pair of links 23 for each scraper with the links pivoted to the body by pins 18 and to the scraper by pins 24. A cross stiffener 25 may be provided between adjacent links.

It will be seen that by this arrangement, as force is applied to move a scraper inwardly, its associated spring will flex along its entire length between pins 18 and 20 while the scraper will move slightly rearwardly on the spring but restrained from excessive movement by links 23. The scraper does not exert any clamping action on the spring so as to interfere with it acting as a unitary spring from end to end and yet the scraper is always biased outwardly to exert a maximum area of scraping face against the pipeline wall regardless of its radial position. Also, the scraper is free, within limits, to assume different angular positions with respect to the pig body as may be dictated when it passes flats or other irregularities in the pipeline walls.

By making those portions of cups 11 and 14, bumpers 15 and scraper ribs 16e which contact the pipeline wall of an organic material having the rigidity and flexing properties of polyurethane, preferably of polyurethane itself, the pig can be used on internally plastic coated pipelines with a minimum risk of scratching or otherwise marring the coating and in pipelines made of thin-walled high tensile steel without scratching the steel.

The pig body is shown with a plurality of fore and aft bypassing openings 25 and 26 respectively with one or more of the openings in each set open, some of the pipeline fluid can bypass through the scraping area between the cups to carry away dislodged deposits. By leaving all of aft openings 26 open and plugging the fore openings 25, as by plugs 27, fluid bypass is minimized and the effective force of the pipeline fluid is applied across the front cup 11 and plate 13 to largely "pull" the pig through the pipeline thereby increasing its stability in the pipeline. All of the holes 25 need not be plugged so that a combination "pulling action" and bypass can be realized.

The invention having been described, what is claimed is:

I claim:

1. A pipeline pig comprising, in combination, a body including at least one circumferential seal means adapted, when the body is inserted into a pipeline, to form a sliding seal with the inner walls of the pipeline, a plurality of leaf springs arranged about the body and extending longitudinally thereof, means mounting the springs on the body to permit at least one end of each spring to move longitudinally along the body when a portion of the spring intermediate its ends is moved radially of the body to flex the spring, a plurality of scraping elements respectively having a sliding engagement with said intermediate portion of a spring so that the scraping element is slidable along the spring without imparting any substantial longitudinal forces to the spring, and means connecting the scraping elements to the body to limit movement of the scraping elements along the springs as the pig is moved through a pipeline and yet permitting the spring portions and scraping elements to be moved radially of the body.

2. The pig of claim 1 wherein said connecting means includes links pivoted to the body and to the respective scraping elements.

3. The pig of claim 1 wherein at least some of said scraping elements include ribs engageable with the wall of the pipeline when the pig is inserted therein with the ribs extending generally longitudinally of the body but inclined at an acute angle with respect to the longitudinal axis of the body to thereby not only effect a plowing action on the pipeline walls but also tend to rotate the pig as it moves along the pipeline.

4. The pig of claim 3 wherein the portions of said circumferential seal means and of the scraping elements including said ribs which contact the pipeline wall are of an organic material having the rigidity and flexing properties of polyurethane.

5. A pipeline pig comprising in combination, a body including at least one circumferentially extending seal means adapted when the body is inserted into the pipeline to form a sliding seal with the inner walls of the pipeline and said body and seal means forming a piston in the pipeline against which fluid flowing through the pipeline acts to move the pig along the pipeline, a plurality of bowed leaf springs arranged about the body and extending longitudinally thereof, means mounting the springs on the body to permit both ends of a spring to pivot with respect to the body when an intermediate portion of the spring is moved radially of the body to flex the spring, a plurality of scrapers respectively having a sliding nonclamping engagement with a spring so that when force is applied to a scraper to move it inwardly, its associated spring is free to flex as a single effective spring along its entire length between said ends and means limiting movement of the scrapers along the springs without exerting any clamping forces between the scrapers and springs.

6. The pig of claim 5 wherein said scrapers each have a plurality of upstanding elongated ribs for contacting the inner walls of the pipeline when the pig is inserted therein, said ribs being inclined at an acute angle with respect to the longitudinal axis of the body so that they exert a plowing action on the inner walls of the pipeline and tend to rotate the pig as it moves along the pipeline.

7. The pig of claim 6 wherein the trailing end of each rib is disposed in circumferential offset relationship with respect to the leading end of the next adjacent rib so that the ribs as a group afford full-circle coverage of the inner walls of the pipeline.

8. The pig of claim 5 wherein said movement limiting means includes a link for each scraper with such link being pivotally connected to the body and its scraper.